United States Patent
Chanda et al.

(10) Patent No.: US 10,163,088 B2
(45) Date of Patent: *Dec. 25, 2018

(54) EMBEDDED DOCUMENT WITHIN AN APPLICATION

(71) Applicant: Adobe Systems Incorporated, San Jose, CA (US)

(72) Inventors: Rupen Chanda, San Francisco, CA (US); Pruthvish Shankarappa, Davis, CA (US)

(73) Assignee: Adobe Systems Incorporated, San Jose, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/371,870

(22) Filed: Dec. 7, 2016

(65) Prior Publication Data

US 2017/0091734 A1     Mar. 30, 2017

Related U.S. Application Data

(60) Division of application No. 14/844,750, filed on Sep. 3, 2015, now Pat. No. 9,582,478, which is a continuation of application No. 13/620,522, filed on Sep. 14, 2012, now Pat. No. 9,164,963, which is a division of application No. 11/567,111, filed on Dec. 5, 2006, now abandoned.

(51) Int. Cl.
| | |
|---|---|
| *G06F 9/44* | (2018.01) |
| *G06Q 20/14* | (2012.01) |
| *G06F 17/21* | (2006.01) |
| *H04L 29/08* | (2006.01) |
| *G06Q 30/04* | (2012.01) |

(52) U.S. Cl.
CPC .......... *G06Q 20/145* (2013.01); *G06F 17/21* (2013.01); *G06F 17/211* (2013.01); *G06F 17/212* (2013.01); *G06Q 30/04* (2013.01); *H04L 67/04* (2013.01); *H04L 67/34* (2013.01)

(58) Field of Classification Search
USPC .......................................................... 717/111
See application file for complete search history.

(56) References Cited

U.S. PATENT DOCUMENTS

| | | | |
|---|---|---|---|
| 5,797,098 | A | 8/1998 | Schroeder et al. |
| 6,025,841 | A | 2/2000 | Finkelstein et al. |
| 6,188,401 | B1 | 2/2001 | Peyer |
| 6,195,569 | B1 | 2/2001 | Frederiksen |
| 6,292,099 | B1 | 9/2001 | Tse et al. |
| 6,381,468 | B1 | 4/2002 | Larsen et al. |
| 6,512,529 | B1 | 1/2003 | Janssen et al. |

(Continued)

OTHER PUBLICATIONS

"Adobe Flex 2 Developer's Guide", Adobe Systems, Inc., retrieved from <http://download.macromedia.com/pub/documentation/en/flex2/flex2_devguide.pdf>, 2006, 100 pages.

(Continued)

*Primary Examiner* — Chuck O Kendall
(74) *Attorney, Agent, or Firm* — Wolfe-SBMC

(57) ABSTRACT

Data structures, methods, program products and systems for creating and executing an executable file for the Binary Runtime Environment for Wireless (BREW) where the file is capable of causing presentation of a document embedded in the file on a BREW system.

20 Claims, 6 Drawing Sheets

(56) References Cited

U.S. PATENT DOCUMENTS

| | | |
|---|---|---|
| 6,529,744 B1 | 3/2003 | Birkler et al. |
| 6,729,929 B1 | 5/2004 | Sayers et al. |
| 6,732,358 B1 | 5/2004 | Siefert |
| 6,757,372 B1 | 6/2004 | Dunlap |
| 6,775,362 B1 | 8/2004 | Ransom |
| 6,892,067 B1 | 5/2005 | Sharma |
| 6,928,468 B2 | 8/2005 | Leermakers |
| 6,964,061 B2 | 11/2005 | Cragun et al. |
| 6,976,217 B1 | 12/2005 | Vertaschitsch |
| 6,983,421 B1 | 1/2006 | Lahti et al. |
| 7,003,327 B1 | 2/2006 | Payne et al. |
| 7,035,629 B2 | 4/2006 | Fujii |
| 7,096,474 B2 | 8/2006 | Wong et al. |
| 7,099,685 B2 | 8/2006 | Park et al. |
| 7,142,977 B2 | 11/2006 | Knuuttila et al. |
| 7,152,203 B2 | 12/2006 | Gao et al. |
| 7,158,788 B2 | 1/2007 | Holler et al. |
| 7,159,500 B2 | 1/2007 | John et al. |
| 7,165,099 B2 | 1/2007 | Sprigg et al. |
| 7,167,728 B1 | 1/2007 | Wagner et al. |
| 7,187,948 B2 | 3/2007 | Alden |
| 7,243,164 B2 | 7/2007 | Vegge |
| 7,275,243 B2 | 9/2007 | Gibbons et al. |
| 7,283,841 B2 | 10/2007 | Luke et al. |
| 7,299,289 B1 | 11/2007 | Lorenz et al. |
| 7,299,409 B2 | 11/2007 | Joshi et al. |
| 7,308,689 B2 | 12/2007 | Black et al. |
| 7,310,784 B1 | 12/2007 | Gottlieb et al. |
| 7,316,003 B1 | 1/2008 | Dulepet et al. |
| 7,319,862 B1 | 1/2008 | Lincoln et al. |
| 7,403,209 B2 | 7/2008 | Liao et al. |
| 7,478,158 B1 | 1/2009 | Rodgers et al. |
| 7,480,422 B2 | 1/2009 | Ackley et al. |
| 7,634,559 B2 | 12/2009 | Brown |
| 7,639,943 B1 | 12/2009 | Kalajan |
| 7,706,782 B1 | 4/2010 | Hosmer et al. |
| 7,743,339 B1 | 6/2010 | Chanda et al. |
| 9,164,963 B2 * | 10/2015 | Chanda .................. G06F 17/21 |
| 9,582,478 B2 * | 2/2017 | Chanda .................. G06F 17/21 |
| 2002/0140729 A1 | 10/2002 | Price et al. |
| 2002/0152239 A1 | 10/2002 | Bautista-Lloyd et al. |
| 2002/0161634 A1 | 10/2002 | Kaars |
| 2002/0161796 A1 | 10/2002 | Sylthe |
| 2003/0105845 A1 | 6/2003 | Leermakers |
| 2003/0167318 A1 | 9/2003 | Robbin et al. |
| 2003/0210270 A1 | 11/2003 | Clow et al. |
| 2004/0034853 A1 | 2/2004 | Gibbons et al. |
| 2004/0104938 A1 | 6/2004 | Saraswat et al. |
| 2004/0203384 A1 | 10/2004 | Sugikawa et al. |
| 2004/0213296 A1 | 10/2004 | Kanayama et al. |
| 2004/0215652 A1 | 10/2004 | Muller et al. |
| 2004/0237068 A1 | 11/2004 | Ren |
| 2004/0260652 A1 | 12/2004 | Rose |
| 2005/0090246 A1 | 4/2005 | Leermakers |
| 2005/0131837 A1 | 6/2005 | Sanctis et al. |
| 2005/0172154 A1 | 8/2005 | Short et al. |
| 2005/0215238 A1 | 9/2005 | Macaluso |
| 2005/0226188 A1 | 10/2005 | Santhoff et al. |
| 2005/0246193 A1 | 11/2005 | Roever et al. |
| 2005/0246703 A1 | 11/2005 | Ahonen |
| 2005/0246726 A1 | 11/2005 | Labrou et al. |
| 2005/0266884 A1 | 12/2005 | Marriott et al. |
| 2006/0013502 A1 | 1/2006 | Weigand |
| 2006/0015819 A1 | 1/2006 | Hawkins et al. |
| 2006/0026304 A1 | 2/2006 | Price |
| 2006/0123360 A1 | 6/2006 | Anwar et al. |
| 2006/0153040 A1 | 7/2006 | Girish et al. |
| 2006/0165104 A1 | 7/2006 | Kaye |
| 2006/0171515 A1 | 8/2006 | Hintermeister et al. |
| 2006/0184968 A1 | 8/2006 | Clayton et al. |
| 2006/0200815 A1 | 9/2006 | Li |
| 2006/0206918 A1 | 9/2006 | McLean |
| 2006/0224943 A1 | 10/2006 | Snyder et al. |
| 2006/0250578 A1 | 11/2006 | Pohl et al. |
| 2006/0256130 A1 | 11/2006 | Gonzalez |
| 2006/0265508 A1 | 11/2006 | Angel |
| 2006/0271696 A1 | 11/2006 | Chen et al. |
| 2007/0026799 A1 | 2/2007 | Wang et al. |
| 2007/0038931 A1 | 2/2007 | Allaire et al. |
| 2007/0130331 A1 | 6/2007 | Kao et al. |
| 2007/0140116 A1 | 6/2007 | Vega-Garcia |
| 2007/0155426 A1 | 7/2007 | Balakrishnan et al. |
| 2007/0220504 A1 | 9/2007 | Eker |
| 2007/0277230 A1 | 11/2007 | Hawkins et al. |
| 2008/0059533 A1 | 3/2008 | Krikorian |
| 2008/0077956 A1 | 3/2008 | Morrison et al. |
| 2008/0147671 A1 | 6/2008 | Simon et al. |
| 2008/0184128 A1 | 7/2008 | Swenson et al. |
| 2008/0222520 A1 | 9/2008 | Balakrishnan et al. |
| 2008/0261657 A1 | 10/2008 | Amit |
| 2008/0268911 A1 | 10/2008 | Eronen et al. |
| 2009/0031418 A1 | 1/2009 | Matsuda et al. |
| 2009/0042599 A1 | 2/2009 | Scott |
| 2009/0094272 A1 | 4/2009 | Skriletz |
| 2011/0113320 A1 | 5/2011 | Neff et al. |
| 2013/0166439 A1 | 6/2013 | Chanda et al. |
| 2013/0167024 A1 | 6/2013 | Chanda et al. |
| 2015/0378964 A1 | 12/2015 | Chanda et al. |

OTHER PUBLICATIONS

"Advisory Action", U.S. Appl. No. 11/567,111, dated Nov. 8, 2012, 3 pages.

"Binary Runtime Environment for Wireless", BREW 2.1 API Reference, Qualcomm, May 8, 2003, 43 pages.

"BPAI Decision", U.S. Appl. No. 11/567,111, Nov. 3, 2015, 8 pages.

"BSQUARE Delivers PDF Viewing Capabilities for Windows Powered Devices", Business Wire, Oct. 16, 2000, 3 pages.

"Examiner's Answer to Appeal", U.S. Appl. No. 11/567,111, dated Apr. 26, 2013, 24 pages.

"Final Office Action", U.S. Appl. No. 11/567,111, dated Aug. 2, 2012, 21 pages.

"Final Office Action", U.S. Appl. No. 13/620,522, dated Mar. 19, 2015, 6 pages.

"International Search Report", Application No. PCT/US2008/056278, dated Aug. 12, 2009, 13 pages.

"Non-Final Office Action", U.S. Appl. No. 11/567,111, dated Dec. 14, 2010, 16 pages.

"Non-Final Office Action", U.S. Appl. No. 11/567,111, dated Mar. 12, 2012, 18 pages.

"Non-Final Office Action", U.S. Appl. No. 11/567,111, dated Jul. 1, 2010, 14 pages.

"Non-Final Office Action", U.S. Appl. No. 12/577,035, dated Jul. 25, 2011, 7 pages.

"Non-Final Office Action", U.S. Appl. No. 13/620,522, dated Dec. 4, 2014, 12 pages.

"Non-Final Office Action", U.S. Appl. No. 14/844,750, dated Sep. 16, 2016, 6 pages.

"Notice of Allowance", U.S. Appl. No. 11/567,111, dated Aug. 29, 2011, 5 pages.

"Notice of Allowance", U.S. Appl. No. 13/620,522, dated Jun. 19, 2015, 7 pages.

"Notice of Allowance", U.S. Appl. No. 14/844,750, dated Nov. 18, 2016, 7 pages.

"Notice of Panel Decision from Pre-Appeal Brief Review", U.S. Appl. No. 11/567,111, dated Dec. 27, 2012, 2 pages.

"Restriction Requirement", U.S. Appl. No. 11/567,111, dated Mar. 30, 2010, 6 pages.

"U.S. Application as Filed", U.S. Appl. No. 10/791,298, filed Mar. 1, 2007, 43 pages.

"U.S. Application as Filed", U.S. Appl. No. 10/791,299, filed Mar. 1, 2004, 26 pages.

"U.S. Application as Filed", U.S. Appl. No. 10/791,311, filed Mar. 1, 2004, 27 pages.

Flanagan,"Java Foundation Classes in a Nutshell: A Desktop Quick Reference", Section 2.6, O'Reilly Publishing, retrieved from <http://

(56) References Cited

OTHER PUBLICATIONS docstore.mik.ua/orelly/java-ent/jfc/index.htm> on Feb. 27, 2012, Sep. 1999, 8 pages.

* cited by examiner

EMBEDDED DOCUMENT WITHIN AN APPLICATION

CROSS REFERENCE TO RELATED APPLICATIONS

This application is a divisional application of U.S. utility application Ser. No. 14/844,750, filed Sep. 3, 2015, which is a continuation application of U.S. utility application Ser. No. 13/620,522, filed on Sep. 14, 2012, which is a divisional of and claims priority to U.S. utility application Ser. No. 11/567,111, filed on Dec. 5, 2006, the entire content of each of which is incorporated herein by reference.

BACKGROUND

This invention relates to software development, and more particularly to content distribution.

It can be difficult for content publishers to create engaging experiences for new mobile phones and other consumer electronics devices since such devices typically have proprietary hardware interfaces and lack mature software development tools. Moreover, content developed for one device may not be compatible with other devices. To overcome this issue, content publishers may need to create custom presentation software for each device to which they publish content. However, this makes publishing content to different devices cumbersome at best.

SUMMARY

In general, one aspect of the subject matter described in this specification can be embodied in a data structure within a computer memory. The data structure comprises an application for the Binary Runtime Environment for Wireless (BREW), the application includes an executable portion and a document portion. The executable portion is capable of signaling an external module to cause presentation of the document by the external module.

These and other aspects can optionally include one or more of the following features. The document can be one of: a Flash document, a Shockwave document, or a Portable Document Format (PDF) document. The document can be compressed, encrypted or both. The external module can be a BREW extension. The external module is compiled separately from the application.

In general, another aspect of the subject matter described in this specification can be embodied in a data structure within a computer memory. The data structure comprises an executable module for BREW. The executable module includes an executable portion and a Flash content portion, where the executable portion is capable of causing the presentation of the Flash content on a mobile device.

These and other aspects can optionally include one or more of the following features. The document can be compressed, encrypted or both. The external module can be a BREW extension. The external module can be compiled separately from the application.

In general, another aspect of the subject matter described in this specification can be embodied in a method that includes identifying an application for BREW. The application includes an executable portion and a document portion. The executable portion is executed, where the execution causes presentation of the document portion by signaling an external module capable of causing the presentation of the document. Other embodiments of this aspect include corresponding systems, apparatus, and computer program products.

These and other aspects can optionally include one or more of the following features. The document can be one of: a Flash document, a Shockwave document, or a Portable Document Format (PDF) document. The external module can be a BREW extension. The external module can be compiled separately from the application. An account can be debited or credited based on the identifying, the executing or the signaling. An account to be debited or credited based on receiving the application and the external module.

In general, another aspect of the subject matter described in this specification can be embodied in a method that includes receiving a BREW application that contains a document. An external module is received and the application is executed, where the executing causes presentation of the document by signaling the external module. An account is debited or credited based on the receiving, the executing or the signaling. Other embodiments of this aspect include corresponding systems, apparatus, and computer program products.

These and other aspects can optionally include one or more of the following features. The document can one of: a Flash document, a Shockwave document, or a Portable Document Format (PDF) document. The external module can be a BREW extension. The external module can be compiled separately from the application.

Particular embodiments of the subject matter described in this specification can be implemented to realize one or more of the following advantages. Documents can be easily packaged for presentation in a BREW environment. Document distribution and presentation can automatically tie into a revenue generation system. Necessary presentation software can be automatically downloaded on the target device when the document is first presented to a user. Since the content is part of a binary package the package provides implicit security to the content. Since content is part of the binary module and the binary module is loaded by the system no additional run time memory may be required to load the content.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
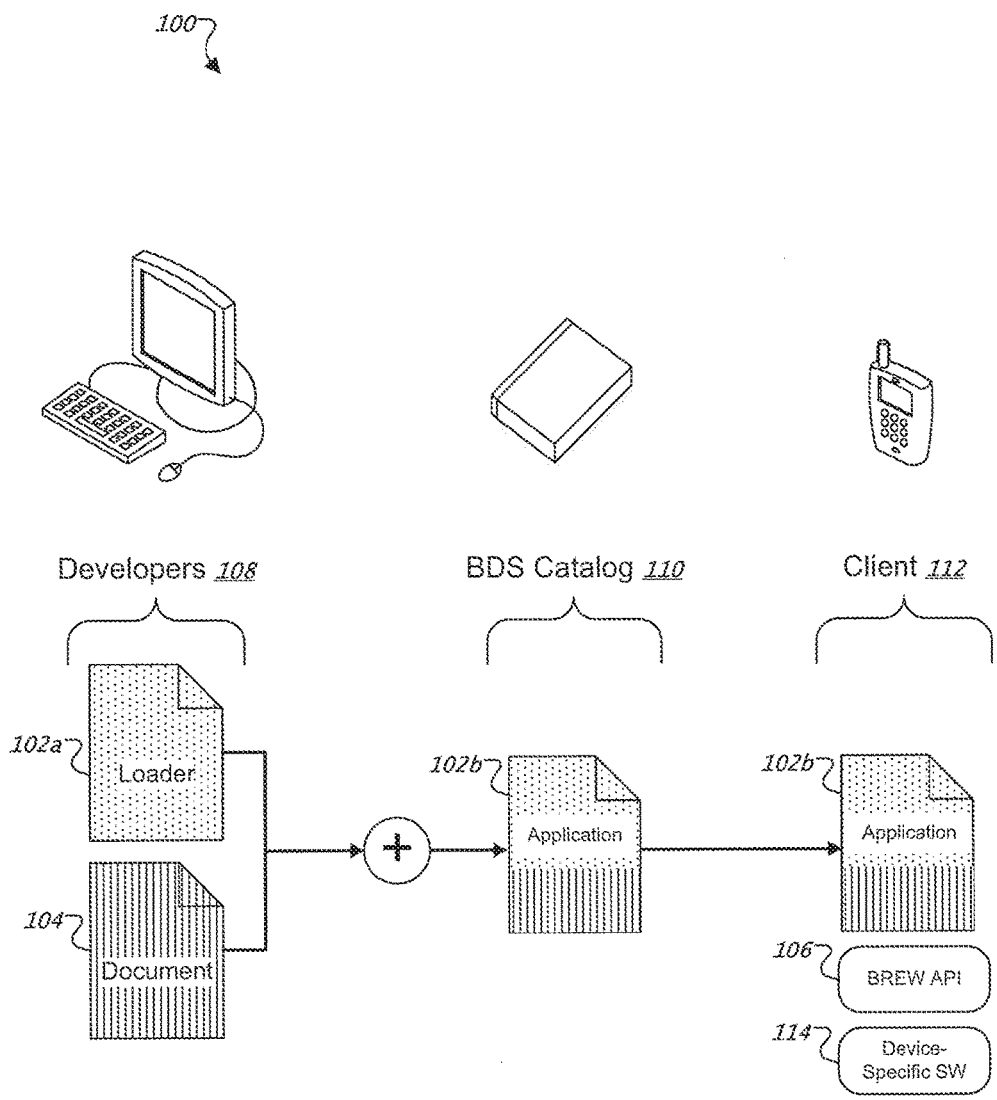
FIG. 1 is a schematic diagram of the creation and distribution of an escort application.

FIG. 1 is a schematic diagram 100 of the creation and distribution of an application program 102b created for the Binary Runtime Environment for Wireless (BREW), available from Qualcomm Incorporated of San Diego, Calif. BREW is an application development platform created by Qualcomm for wireless devices. The wireless device 112, hereafter referred to as a "client", can be a cellular phone, a personal digital assistant (PDA), a Blackberry, a laptop computer, a Pocket PC, an electronic gaming device, a media player, or combinations of these. In some implementations, the client 112 does not have wireless connectivity. An advantage of the BREW platform is that it hides specifics of the underlying device from applications which allows applications to be easily ported to different devices.

A so-called "escort" application program (e.g., 102*b*) encapsulates a document (e.g., 104) such as, for example, an Adobe Flash document, and enables the document to be downloaded to and presented on clients that support BREW (e.g., 112). Flash and Flash Player are available from Adobe Systems Incorporated of San Jose, Calif. Adobe Flash is an Integrated Development Environment (IDE) for developing Flash documents that support, for instance, rich content, user interfaces, and web applications. Adobe Flash Player is a multiple-platform virtual machine used to present Flash documents. Flash is commonly used to create interactive web page content such as advertisements, integrate video into web pages, and create rich, client-side applications, for example.

A BREW system includes a set of Application Programming Interfaces (APIs) 106 for running software on clients (e.g., 112). The APIs 106 allow application software (e.g., 102*b*) to be independent of client's native software 114. The BREW APIs 106 provide applications access to a client's communication systems, input systems (e.g., microphones, cameras), and output systems (e.g., displays, speakers). Moreover, the BREW APIs 106 also allow applications to take advantage of an automatic billing model which can automatically charge a user for downloading an application or parts of an application, running an application, or combinations of these.

To create the escort application 102*b*, a software developer 108 first creates or identifies a document 104 for presentation on the client device 112. The document 104 can include text, graphics, sound, animation, other multimedia content, and combinations of these. The document 104 is not limited to a particular content format and can contain interactive content. For example, the document 104 can be formatted as a Shockwave (from Adobe Systems Incorporated), Portable Document Format (PDF), Flash, Flash Lite (from Adobe Systems Incorporated), a sound or music file, an electronic game executable, a movie or animation file, or graphic file, etc. The document 104 can additionally be compressed, encrypted or both.

The developer 108 uses a software development tool to combine a document loader portion 102*a* with the document 104 to create the BREW escort application 102*b*. The document loader portion 102*a* is a BREW application. In some implementations, the software development tool can insert the document 104 contents into a data segment of the document loader portion 102*a*. The new escort application 102*b* can be uploaded to a BREW Distribution System (BDS) as an item within a BDS catalog 110. The BDS catalog 110 is a system in which BREW applications are made available over a wireless service provider to end users through a wireless service provider's Application Download Server (ADS). A wireless service provider, also known as a wireless carrier, mobile phone operator, or cellular provider, is a company that provides communication services for its subscribers' wireless devices.

A client user can browse a wireless service provider's ADS to locate BREW applications available within the BDS catalog 110, such as the escort application 102*b*, for download to the client 112. Once the escort application 102*b* is downloaded to the client 112, a user can choose to execute the escort application 102*b* or the escort application 102*b* can automatically execute. Execution of the escort application 102*b* causes execution of the document loader portion 102*a* which, in turn, causes presentation of the document 104 on the client 112, as will be described in more detail below.

Figure 2:
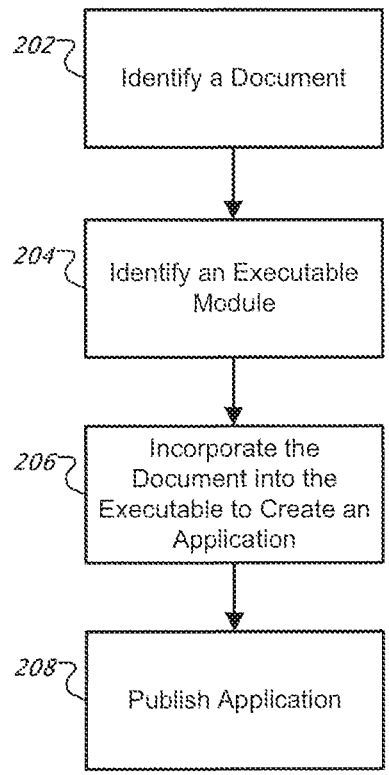
FIG. 2 is a flow chart of the creation and distribution of an escort application.

FIG. 2 illustrates a flow chart of a method 200 for the creation and distribution of an escort application (e.g., 102*b*). A document (e.g., 104) is identified for eventual presentation on a client (e.g., 112; step 202). For example, the document can be a Flash document or a PDF document. A document loader portion (e.g., 102*a*) is identified which contains instructions capable of causing presentation of the document on a client (e.g. 112; step 204). In some implementations, the document loader portion is specific to the type of document. In addition, the document loader portion can be specific to the type of client user billing desired (e.g. pay-per-download, pay-per-play, etc.).

The document and the document loader portion are then incorporated into an escort application (e.g. 102*b*; step 206). A software development tool, for example a compiler product, can bundle a document with a document loader into an escort application. The development tool can also compress and/or encrypt the document. The escort application is then published in an application catalog such as the BDS catalog, for example (step 208). This makes the escort application available to users for downloading into their clients. In some implementations, a client device's wireless service provider provides client access to the catalog and facilitates downloading of the escort application from its servers.

Figure 3:
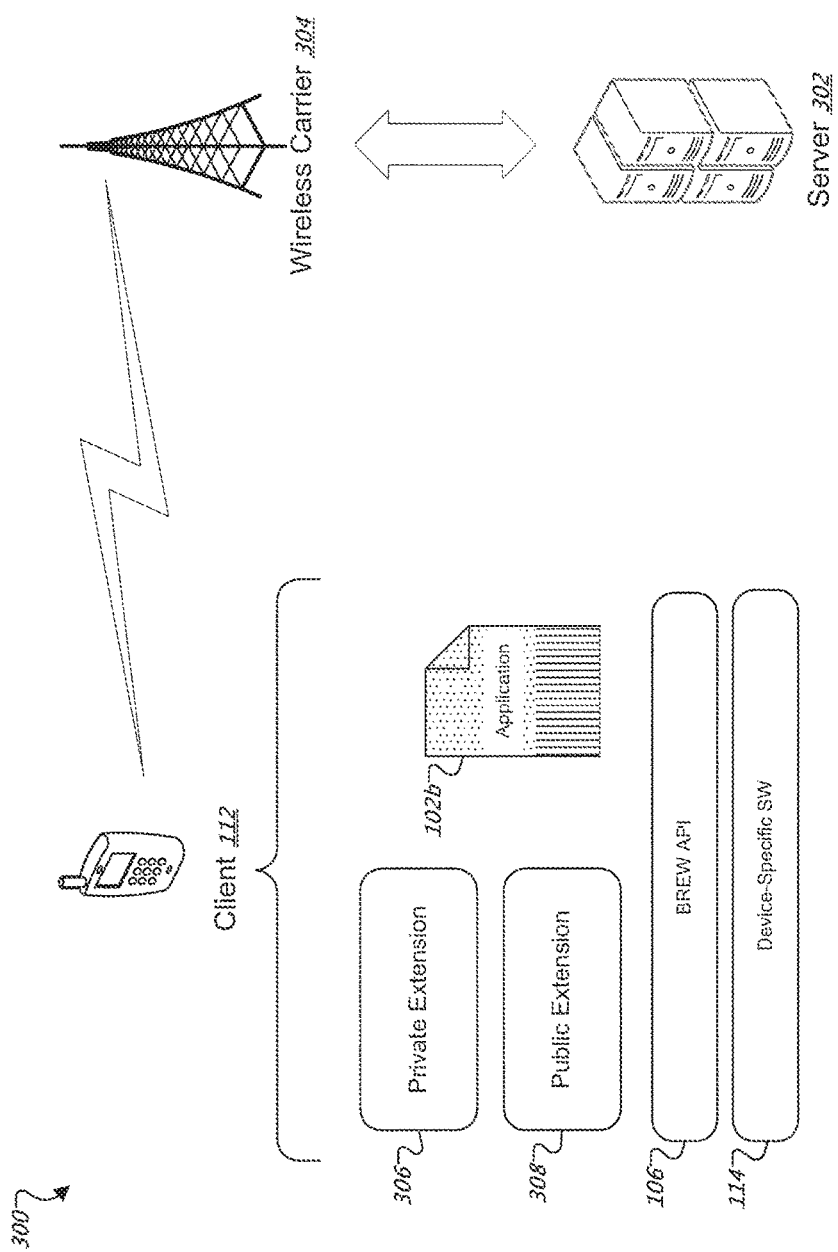
FIG. 3 is a schematic diagram illustrating the execution of an escort application.

FIG. 3 is a schematic diagram 300 illustrating the execution of an escort application. The client 112 can communicate with a wireless service provider network 304 in order to communicate with other clients, such as by sending/receiving instant messages and placing/receiving telephone calls, for example. Additionally, the client 112 can download applications (e.g., escort applications) selected from the BDS catalog 110, or other catalog, by way of the wireless service provider network 304, for example. The server 302 provides access to BREW applications stored in the catalog 110.

The escort application 102*b* is dependent on one or more external modules which are needed to present the document 104. An external module is compiled separately from the escort application 102*b*. In some implementations, an external module is a BREW extension. Extensions are module software that can be downloaded once and shared by a number of applications, similar to Dynamic Link Libraries (DLL) in the Microsoft Windows and Unix operating systems. During or after the escort application 102*b* has been downloaded to the client 112, one or more external modules (e.g., 306 and 308) which are needed by the escort application 102*b* are automatically downloaded from a server (e.g., 302) by the BREW system if they are have not already been downloaded.

The escort application 102*b* can begin to execute automatically after the download process has completed, or the escort application 102*b* can be explicitly invoked by the user. The escort application 102*b* interacts with the public extension 308 by way of one or more APIs, for example, to cause the public extension 308 to present the document 104 bundled within the escort application 102*b*. For example, a public extension 308 API function call could take as arguments the location of the document 104 within the escort application 102b, the document 104's type, the document's 104 length, and other suitable parameters. With this information, the public extension 308 can obtain and present the document 104, such as by providing the document or a reference to the document to a Flash player or a PDF viewer.

In some implementations, the means for presenting the document 104 is incorporated into the public extension 308. In other implementations, the means is incorporated into a private extension 306 so that the escort application 102 does not interact directly with the private extension 306. Instead, the public extension 308 interacts with the private extension 306 on behalf of the escort application 102b. The private extension 306 can include a fine level of granularity in its API which can be taken advantage of by the public extension 308 for controlling the presentation of the document 104. The private extension 306 API can be hidden from applications such that, in some implementations, only through the public extension 308 can an application interact with the private extension 306. This has the advantage of providing a simpler API to applications by hiding more complex APIs behind the public extension 308.

Figure 4A:
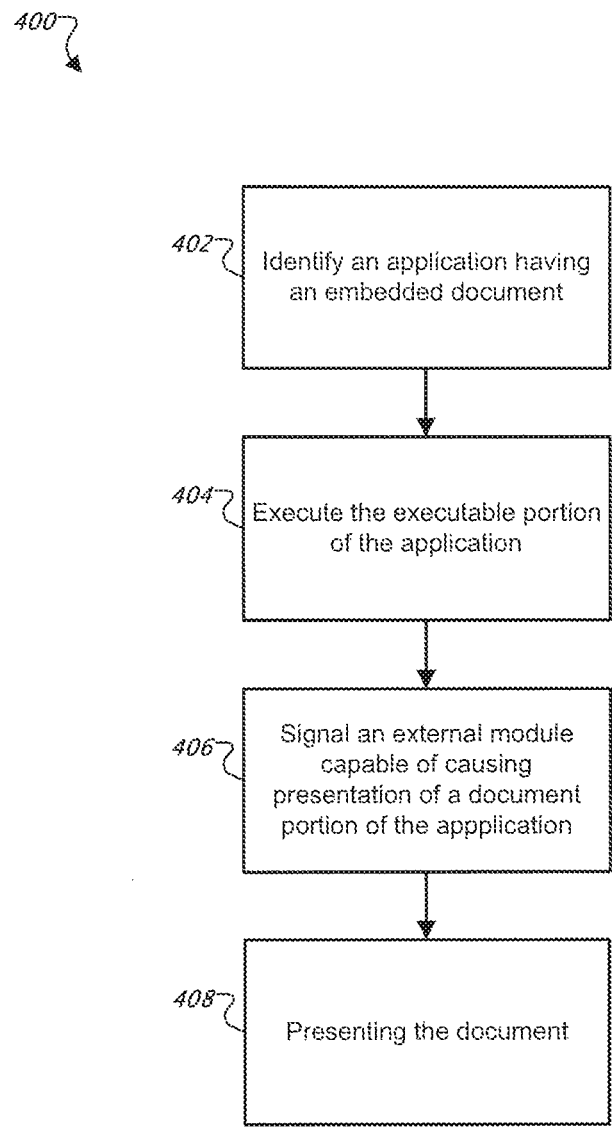
FIG. 4A is a flow chart of the execution of an escort application.

FIG. 4A is a flow chart of a method 400 for the execution of an escort application. The client (e.g., 112) identifies an escort application for execution (e.g., 102b; step 402). For example, such identification can be caused by a user invoking the escort application from a graphical user interface on the client. The client executes the executable portion of the escort application (e.g., 102a; step 404). The escort application signals an external module capable (e.g., 308) capable of causing presentation of the document portion of the BREW application (step 406). The document (e.g., 104) is then presented on the client.

Figure 4B:
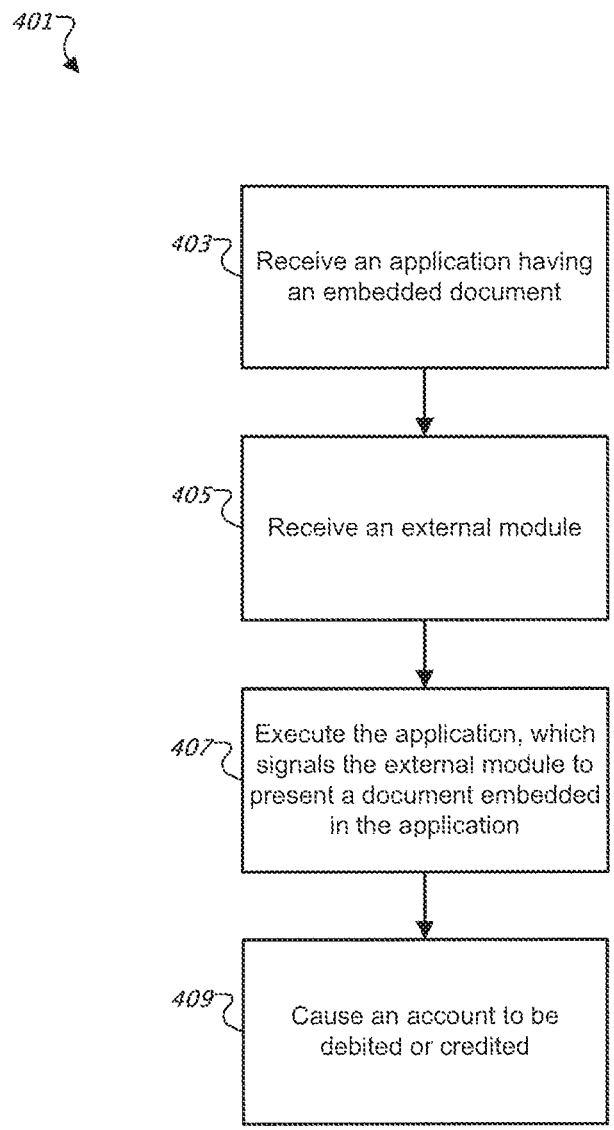
FIG. 4B is another flow chart of the execution of an escort application.

FIG. 4B is another flow chart of a method 400 for the execution of an escort application. A BREW application containing a document is received (e.g., by a client; step 403). An external module (e.g., 306, 308) is received (step 405). The application is then executed, where the execution causes presentation of the document by signaling the received external module (step 407). An account associated with the client is debited or credited based on the first receiving, the second receiving, the executing or the signaling (step 409).

A revenue generation system is built into the BREW environment that allows an account to be automatically charged for downloading files, executing applications, or combinations of these, according to a billing model. In one implementation, the BREW application performs calls to one or more BREW extensions to verify access to the application. For example, a previously downloaded application can require additional payment in order to run because the monthly license for content access has expired. In this circumstance, a BREW extension can be used to enact a debit to the user's wireless service provider service account. In another implementation, a BREW extension can be used to trigger a credit to a user's wireless service provider service account.

Figure 5:
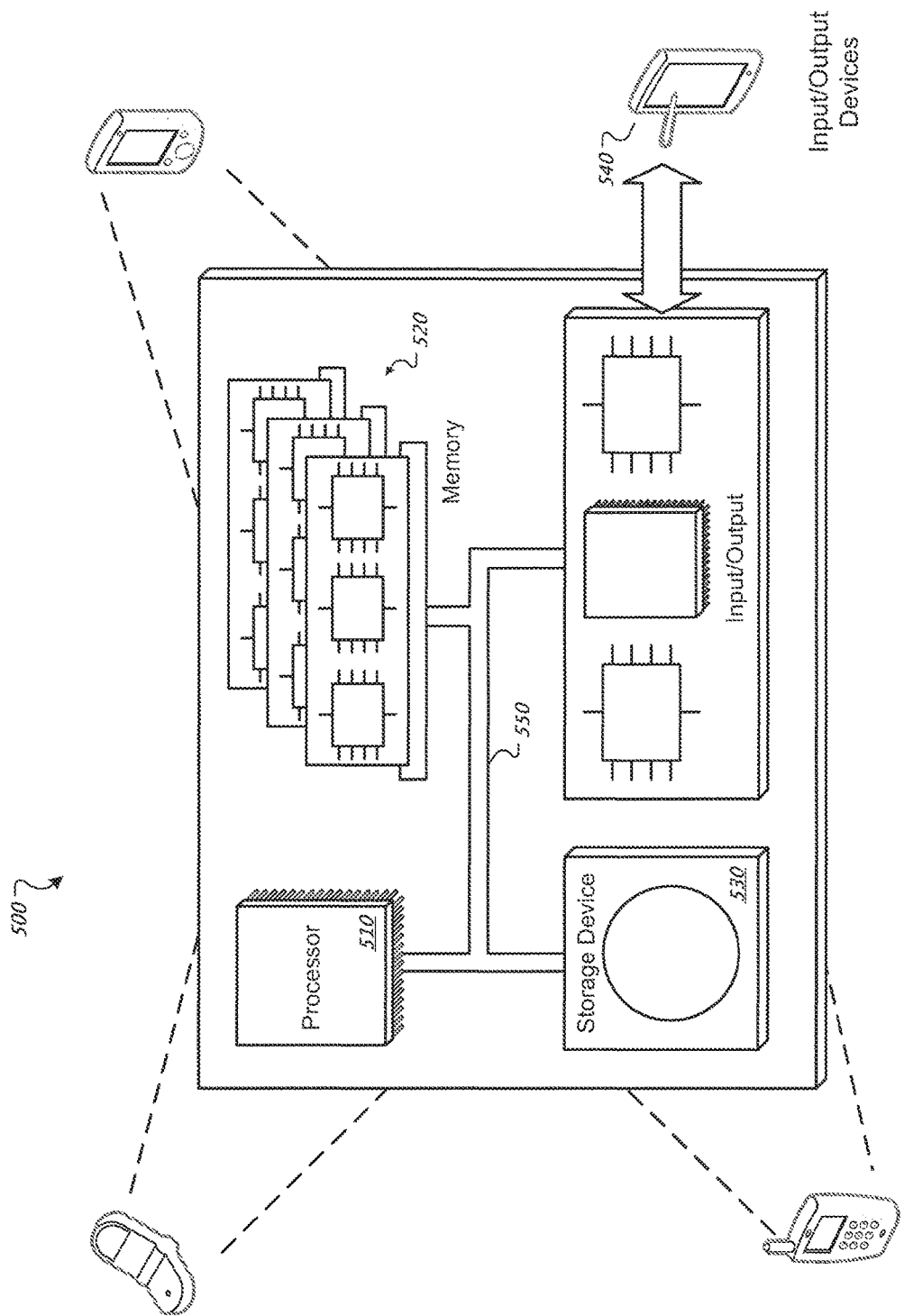
FIG. 5 is a schematic diagram of a client.

FIG. 5 is a schematic diagram of a generic client 500, such as a cell phone, a smart phone, an electronic game device, a personal digital assistance, a digital media player, other devices, and combinations of these. The system 500 can be used for practicing operations described in association with the flow diagrams 400 and 401. The system 500 can include a processor 510, a memory 520, a storage device 530, and input/output devices 540. Each of the components 510, 520, 530, and 540 are interconnected using a system bus 550. The processor 510 is capable of processing instructions for execution within the system 500. Such executed instructions can implement one or more components of system 300, for example. In one implementation, the processor 510 is a single-threaded processor. In another implementation, the processor 510 is a multithreaded processor. The processor 510 is capable of processing instructions stored in the memory 520 or on the storage device 530 to display graphical information for a user interface on the input/output device 540.

The memory 520 is a computer readable medium such as volatile or non volatile that stores information within the system 500. The memory 520 could store data structures representing one or more applications 102b, a private extension 306 and a public extension 308, for example. The storage device 530 is capable of providing persistent storage for the system 500. The storage device 530 can be a floppy disk device, a hard disk device, an optical disk device, a flash drive, or a tape device, or other suitable persistent storage means. The input/output devices 540 provide input/output operations for the system 500. In one implementation, the input/output device 540 includes a keyboard, stylus and/or pointing device. In another implementation, the input/output device 540 includes a display unit for displaying graphical user interfaces.

The input/output device 540 can provide input/output operations for the application 102b. The application 102b can be, for example, an application containing a document 104 formatted in Shockwave, Portable Document Format (PDF), Flash or Flash Lite document format available from Adobe Systems, Incorporated of San Jose, Calif., or another document format or executable format for presentation on a wireless device. The BREW application can include external modules required for its presentation. Examples of such external module software components include private extension 306 and public extension 308. BREW APIs 106 provide translation between the BREW application 102 software and the device-specific software 114 such as the software used for accessing the input/output device 540. Such software components 102, 104, 106, 306, and 308 can be persisted in storage device 530, memory 520 or can be obtained over a network connection, to name a few examples.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what can be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

The invention claimed is:
1. A computer-implemented method, comprising:
   receiving, at a client device, an executable escort application comprising a document portion and a document loader portion including document loader instructions;
   executing, at the client device, the document loader instructions; and responsive to executing the document loader instructions, causing an external module to present the document at the client device.

2. A computer-implemented method as described in claim 1, wherein the document is not limited to a particular document format.

3. A computer-implemented method as described in claim 1, wherein the document contains one or more of text, graphics, sound, animation, or other multimedia content.

4. A computer-implemented method as described in claim 1, wherein the document loader portion is specific to a particular document format.

5. A computer-implemented method as described in claim 1, wherein the document loader portion is specific to a desired type of client user billing.

6. A computer-implemented method as described in claim 5, wherein the desired type of client user billing is a pay-per-download scheme.

7. A computer-implemented method as described in claim 5, wherein the desired type of client user billing is a pay-per-play scheme.

8. A computer-implemented method as described in claim 1, wherein the client device does not have wireless connectivity.

9. A computer-implemented method as described in claim 1, wherein the document includes interactive content.

10. A computer-implemented method as described in claim 9, wherein the interactive content is a sound file, music file, executable electronic game, movie, animation file, or graphic file.

11. A system comprising:
one or more processors; and
a memory coupled to the one or more processors and storing program instructions executable by the one or more processors to cause operations comprising:
receiving an executable escort application comprising a document portion and a document loader portion including document loader instructions;
executing the document loader instructions; and
responsive to executing the document loader instructions, causing an external module to present the document.

12. The system of claim 11, wherein the document is not limited to a particular document format and contains interactive content.

13. The system of claim 11, wherein the document contains interactive content, text, graphics, sound, animation, sound file, music file, executable electronic game, movie, animation file, graphic file, or multimedia content.

14. The system of claim 11, wherein the document loader portion is specific to a particular document format.

15. The system of claim 11, wherein the document loader portion is specific to a desired type of client user billing.

16. The system of claim 15, wherein the desired type of client user billing is a pay-per-download scheme.

17. The system of claim 15, wherein the desired type of client user billing is a pay-per-play scheme.

18. A system comprising:
means for receiving an executable escort application comprising a document portion and a document loader portion including document loader instructions;
means for executing the document loader instructions; and
means for causing an external module to present the document at the client device responsive to executing the document loader instructions.

19. The system of claim 18, wherein the system does not include wireless functionality.

20. The system of claim 18, wherein the executing means is specific to a desired type of client user billing.

* * * * *